United States Patent [19]

Wada et al.

[11] Patent Number: 5,101,355
[45] Date of Patent: Mar. 31, 1992

[54] CONTROL APPARATUS FOR CONTROLLING THE SUPPORT UNIT OF A VEHICLE

[75] Inventors: Shunichi Wada; Yoshihiro Tsuda, both of Himeji, Japan

[73] Assignee: Mitsubishi Denki K.K., Tokyo, Japan

[21] Appl. No.: 529,302

[22] Filed: May 29, 1990

[30] Foreign Application Priority Data

May 29, 1989 [JP] Japan .................................. 1-135224
May 31, 1989 [JP] Japan .................................. 1-137958

[51] Int. Cl.$^5$ .......................................... B60G 17/015
[52] U.S. Cl. ............................... 364/424.05; 280/688; 280/707
[58] Field of Search ........ 364/424.05; 73/11, DIG. 1, 73/579; 280/707, 840, DIG. 1, 688

[56] References Cited

U.S. PATENT DOCUMENTS

| | | | |
|---|---|---|---|
| 4,639,014 | 1/1987 | Tanaka et al. | 280/707 |
| 4,648,622 | 3/1987 | Wada et al. | 280/707 |
| 4,696,489 | 9/1987 | Fujishiro et al. | 280/707 |
| 4,712,807 | 12/1987 | Kurosawa | 280/707 |
| 4,729,580 | 3/1988 | Buma et al. | 280/707 |
| 4,770,438 | 9/1988 | Sugasawa et al. | 280/707 |
| 4,787,650 | 11/1988 | Doi et al. | 280/707 |
| 4,907,154 | 3/1990 | Yasuda et al. | 364/424.05 |

OTHER PUBLICATIONS

"Semi-Active Damping" by M. Lizell, pp. 83-91 IMechE 1988.

Primary Examiner—Parshotam S. Lall
Assistant Examiner—Collin W. Park
Attorney, Agent, or Firm—Sughrue, Mion, Zinn, Macpeak & Seas

[57] ABSTRACT

A control apparatus which detects vertical and/or lateral vibrations of a vehicle body and controls, on the basis of amplitude and frequency of vibration, a characteristic of a support unit for supporting the vehicle body, such as, a damping force and a spring force of suspension or torsion quantity of a stabilizer. The control apparatus, when the detected vibration is high frequency vibration, obtains the frequency of vibration by a measured value of one cycle period, and, when the detected vibration is low frequency vibration, obtains the frequency of vibration by a measured value of a half cycle period.

15 Claims, 7 Drawing Sheets

CONTROL APPARATUS FOR CONTROLLING THE SUPPORT UNIT OF A VEHICLE

BACKGROUND OF THE INVENTION

1. Field of the Invention

The present invention relates to a control apparatus of a support unit for optimumly controlling characteristics of the support unit, that is, a suspension and/or a stabilizer, that supports a vehicle body corresponding to vibrations thereof.

2. Description of Related Art

It is better, for improving comfort to ride in while a vehicle is running, to adapt characteristics of a support unit of the vehicle body to be SOFT. Specifically, it is better that a damping force of a suspension is small, a spring constant thereof is small and soft, and a torsion quantity of a stabilizer is small. On the other hand, it is better, for improving steering stability, to adapt the characteristics of the support unit of the vehicle body to be HARD. Specifically, it is better to increase the damping force of the suspension, to make large and hard the spring constant thereof, and to increase the torsion quantity of the stabilizer.

A control apparatus, which automatically controls to an optimum value the damping force or spring constant of the suspension corresponding to the vertical vibration of the vehicle body, is disclosed in the Japanese Patent Application Laid-Open No. 61-18351. The control apparatus detects vertical vibrations so that, when the detected vertical vibrations exceeds a predetermined amplitude and has a predetermined frequency, it is judged that the vertical vibrations continue, whereby the damping force or spring constant of the suspension is changed over to be larger to restrain continuous vibrations during the vehicle's running on an undulated road.

The vertical vibrations of the vehicle body, detected by an acceleration sensor during the running, changes as shown in, for example, FIG. 5 or 7. Generally, a waveform of low frequency, and large amplitude correspond to above-spring vibration, and a waveform of high frequency and small amplitude correspond to below-spring vibration. The output waveform of the acceleration sensor is periodically sensed to determine the presence of either above-spring vibrations or below-spring vibrations, thereby restraining variations in the posture of the vehicle body on the basis of the detection result.

However, when the detected vibration has a low frequency, a decision time is longer creating a defect, by delaying proper restraint of the variation in the posture of the vehicle body. When a sampling time for an output signal of the acceleration sensor is set (for example, to 8 msec) and the detected vibration has a high frequency, if the decision time is assumed to be a half cycle period, resolution of sampling is poor, so that an error is created more frequently in the determination of frequency as the vibration is higher in frequency. Furthermore, the periodical sensing of the output waveform of the acceleration sensor is defective in that it is difficult to distinguish the above-spring vibration from the below-spring vibration.

SUMMARY OF THE INVENTION

An object of the present invention is to provide a control apparatus of the support unit, which can rapidly decide the frequency, even when vibration has a low frequency, and can properly restrain variations in the posture of the vehicle body.

Another object of the present invention is to provide a control apparatus for a support unit, which can eliminate an error in the determination of frequency without deteriorating resolution of a sampling.

Another object of the present invention is to provide a control apparatus for a support unit, which can easily discriminate above-spring vibration from the below-spring vibration to thereby properly control characteristics of the support unit with respect to vibrations of the vehicle body.

The control apparatus for a support unit, according to the present invention, obtains the frequency in one cycle period for high frequency vibrations and obtains the same in a half cycle period for low frequency vibrations and optimumly controls the characteristics of the support unit based on the obtained frequency and amplitude of the detected vibrations. It is, then, determined, on the basis of the measurement result of a half cycle period or the amplitude of the vibrations, whether the vibrations are of high frequency or low frequency. When it is determined on the basis of the amplitude of the vibrations, a predetermined level for discriminating the low frequency vibration is made higher than that for discriminating the high frequency vibration.

In this case, the characteristics of a support unit is a damping force or a spring constant of a suspension, or torsion quantity of a stabilizer. The detected vibration of the vehicle body is the vertical and/or lateral vibration thereof.

The above and further objects and features of the invention will more fully be apparent from the following detailed description with accompanying drawings.

DESCRIPTION OF THE PREFERRED EMBODIMENTS

First Embodiment

Figure 1:
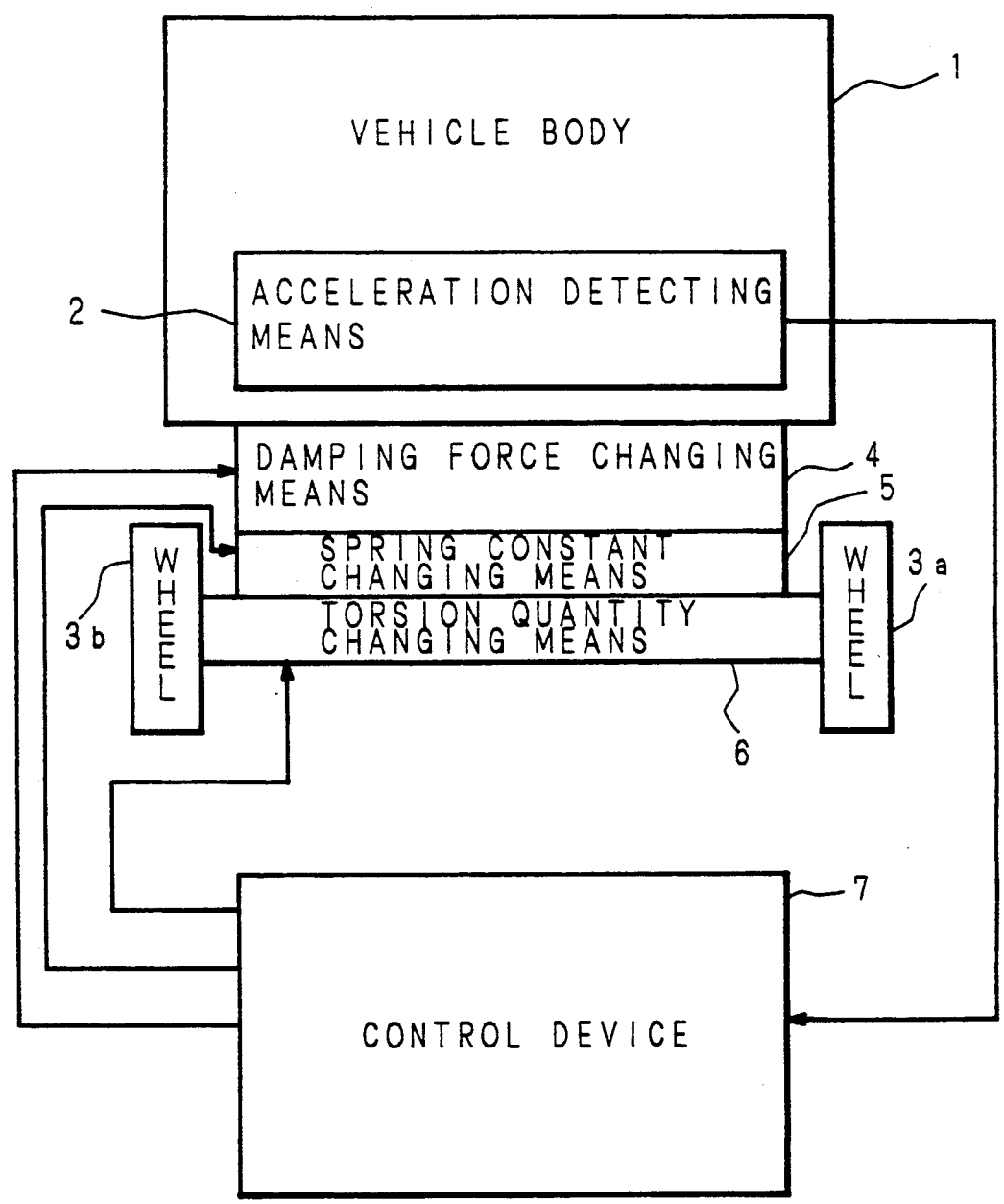
FIG. 1 is a block diagram showing a basic construction of a control apparatus of the present invention.

FIG. 1 is a block diagram of a control apparatus of the present invention, in which a vehicle body 1 is provided with acceleration detecting means 2 for detecting the lateral and/or vertical acceleration of the vehicle body 1, and outputting a detection signal to a control device 7. Between each wheel 3a, 3b and the vehicle body 1 is disposed a suspension as a support unit. Between wheels 3a and 3b is disposed a stabilizer as a support unit. A damping force of the suspension is changed to one of three states, HARD, MEDIUM, and SOFT by a damping force changing means 4. A spring constant of the suspension is changed to one of three states, of HARD, MEDIUM, and SOFT by a spring constant changing means 5. Furthermore, a torsion quantity of the stabilizer is changed to one of three states, HARD, MEDIUM, and SOFT by a torsion quantity changing means 6. The damping force changing means 4, spring constant changing means 5 and torsion quantity changing means 6 all change characteristics of the support unit corresponding thereto on the basis of a command signal from the control device 7. The control device 7 decides the quantity of acceleration and vibration frequency of acceleration on the basis of detection signal from the acceleration detecting means 2, thereby outputting to each change-over means the command signal for changing the characteristics. The damping force changing means 4 and the spring constant changing means 5 use devices as disclosed in Japanese Patent Application Laid-Open No. 60-47709 or No. 240511. The torsion quantity changing means 6 is similar to that which disclosed in Japanese Patent Application Laid-Open No. 63-25119 or No. 63-28709.

Figure 2:
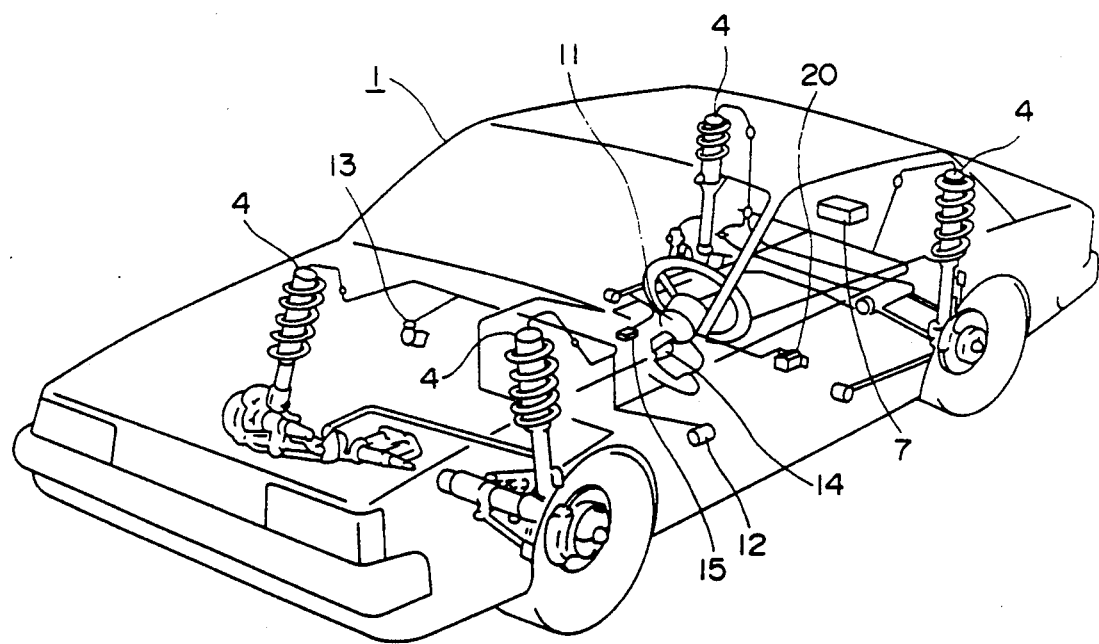
FIG. 2 is a perspective view showing a condition where each member is mounted in a vehicle, when the present invention is applied to change-over of damping force of a suspension.
Figure 3:
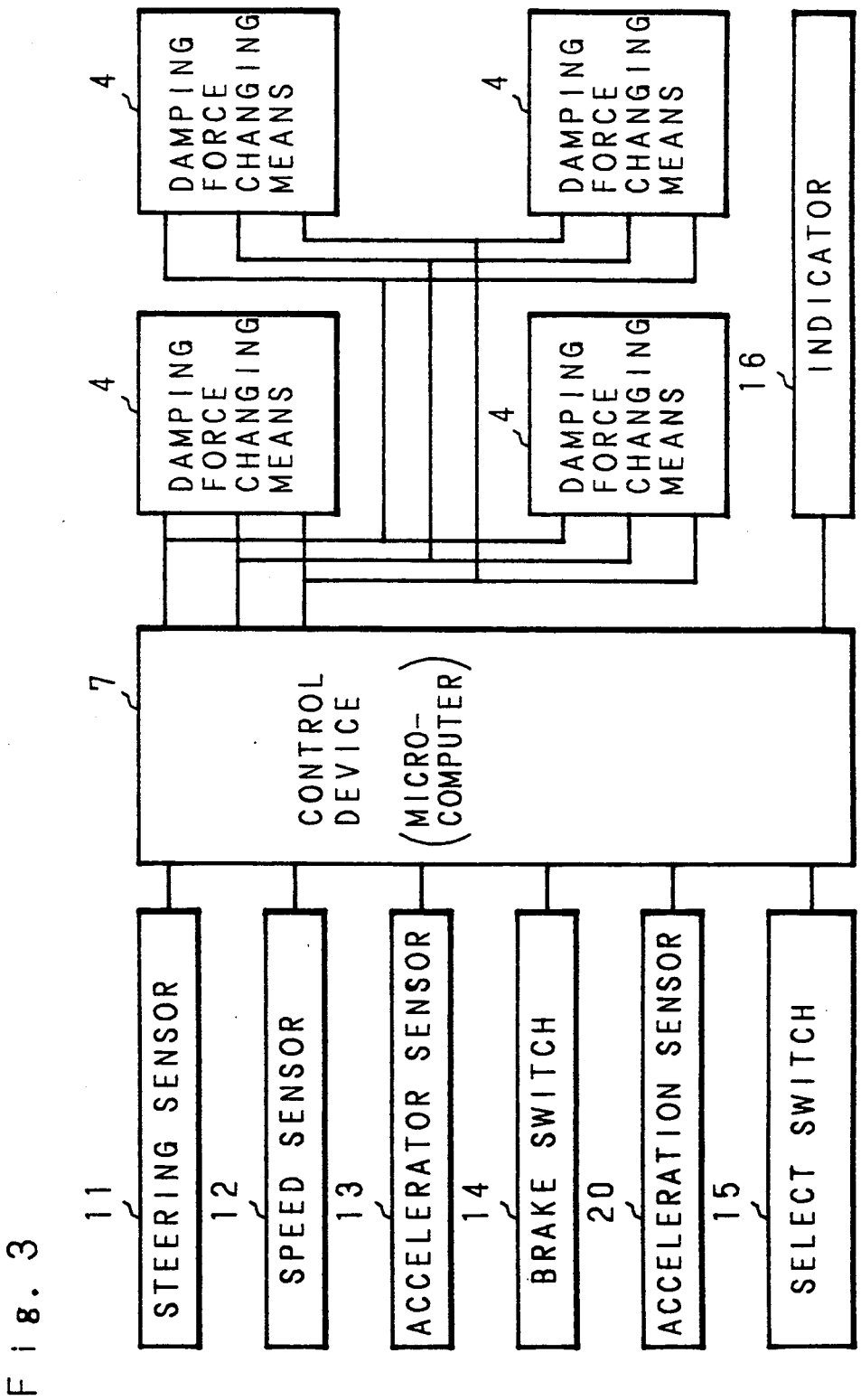
FIG. 3 is a block diagram showing a construction of each member shown in FIG. 2.

FIGS. 2 and 3 show an example of applying the control apparatus of the invention to change the damping force of the suspension, in which the control device 7 comprising a microcomputer is given outputs of a steering sensor 11 for detecting steering condition of a handle, a speed sensor 12 for detecting a vehicle speed, an accelerator sensor 13 for detecting operation of acceleration and deceleration for the vehicle body 1, a brake switch 14 for detecting the braking action, an acceleration sensor 20 as the acceleration detecting means, for detecting the vertical acceleration of the vehicle body 1, and a select switch 15 for setting a standard for selecting characteristics of the damping force. The control device 7 controls four damping force change means 4 for changing the characteristics of four suspensions and an indicator 16 corresponding to the outputs from these sensors and switches.

The acceleration sensor 20, which detects the vertical acceleration, uses an acceleration pickup composed of, for example, a piezoelectric member, a sensor of a differential transformer type, or an acceleration sensor of a semiconductor strain gauge type for a car, and continuously outputs the vertical acceleration by analog voltage on the basis of the output level during the zero acceleration. The output of acceleration sensor 20 is digitally-converted and thereafter inputted to the control device 7 where its signal level and variation duration are obtained. In addition, in the FIG. 2 example, one acceleration sensor 20 is mounted at the center of gravity of the vehicle body 1, but its mounting position may be the utmost end of vehicle body 1, or there may be two sensors 20 with one located in the front and the rear, or one sensor may be provided at every suspension for each wheel.

Figure 4:
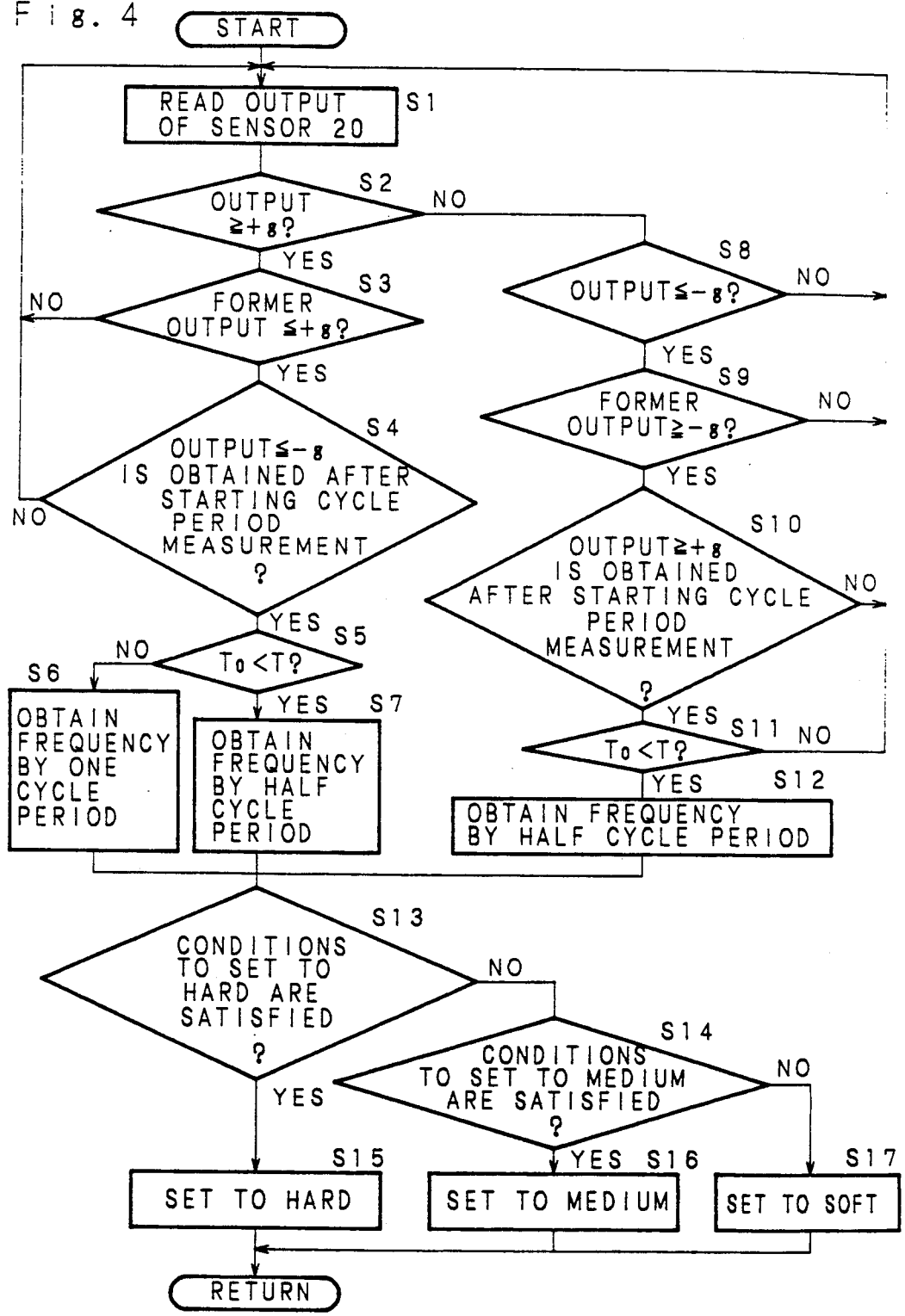
FIG. 4 is a flow chart showing a procedure of first embodiment of the present invention.

Next an explanation will be given on the procedure for the control apparatus 7 with reference to the flow chart in FIG. 4 and the output waveform of the acceleration sensor 20 in FIG. 5. FIG. 9(a) shows the waveform when the vehicle body vibrates in the high frequency and FIG. 5-(b) shows the waveform when the vehicle body vibrates in the low frequency.

Figure 5:
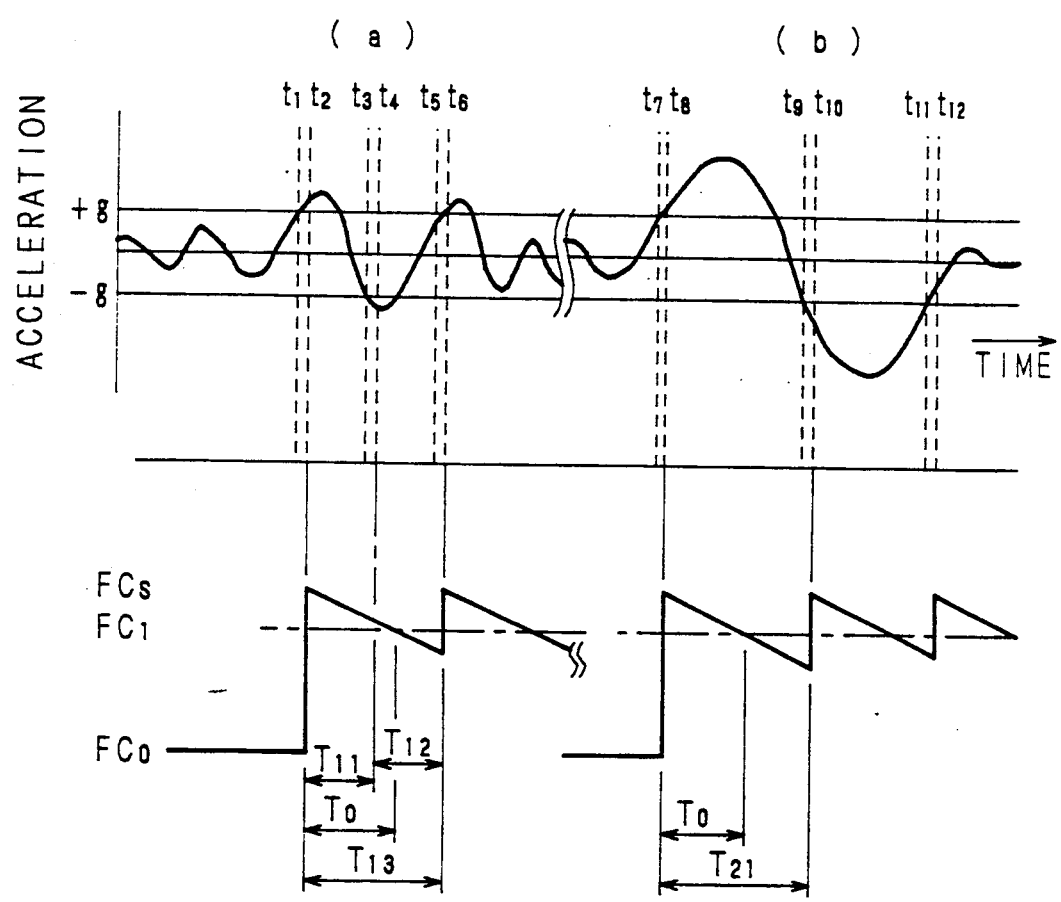
FIG. 5 is a waveform chart of vertical vibration of a vehicle body for explaining the procedure of first embodiment.

In FIG. 5, acceleration not less than the predetermined level is not detected prior to a time point $t_1$, whereby no cycle period measurement is carried out. At a time point $t_2$, after the output of acceleration sensor 20 is read in a step S1, it is judged in a step S2 whether or not the output of acceleration sensor 20 is not less than the predetermined level ($+g$). When it is judged that the acceleration is not less than the predetermined level (YES in step S2), the procedure advances to a step S3. In the step S3, when the former output (in the case, at the point of time $t_1$), of acceleration sensor 20 is not more than the predetermined level ($+g$), a timer Fc for measuring the cycle period is preset to start cycle period measurement.

Next, at the point of time $t_4$, since the output of acceleration sensor is lower than ($-g$), the procedure advances to step S1-S2-S8-S9. In the step S9, it is judged whether or not the former output of the acceleration sensor 20 is not less than ($-g$). In FIG. 5-(a), since the former output (at the point of time $t_3$) of the acceleration sensor 20 is not less than ($-g$), the procedure advances to a step S10. In the step S10, after starting the cycle period measurement, it is judged whether or not the output greater than or equal to ($+g$) is obtained. In FIG. 5-(a), the output of the acceleration sensor 20 exceeds ($+g$) at the point of the $t_2$, whereby the procedure advances to a step S11. In the step S11, a half cycle period T is measured, which is compared with a predetermined value $T_0$. If $T_0 < T$ (YES in step S11), the procedure advances to a step S12, and the frequency is obtained by the measured half cycle period T. In FIG. 5-(a), the half cycle period T becomes $T_{11}$ of a lapse of time from the point of time $t_2$ to $t_4$ and $T_0 > T_{11}$ (NO in step S11), whereby the procedure returns to the step S1.

Also, in the step S3, when the former output of the acceleration sensor 20 is not more than ($+g$), the procedure advances to a step S4. In the step S4, after starting cycle period measurement, it is judged whether or not the output less than or equal to ($-g$) is obtained. Since the output of the acceleration sensor 20 is lower than ($-g$) at the point of time $t_4$, the procedure advances to a step 5. In the step S5, the half cycle period T is measured, which is compared with the predetermined value $T_0$. If $T_0 < T$ (YES in step S5), the procedure advances to a step S7 and the frequency is obtained by the measured half cycle period T. If not, (NO in step S5), the frequency is obtained by the measured value of one cycle period. In FIG. 5-(a), the half cycle period T is a lapse of time $T_{12}$ from the point of time $t_4$ to $t_6$, and because of $T_0 > T_{12}$, the procedure advances to the step 6, so that the frequency is obtained on the basis of one cycle period $T_{13}$ of a lapse of time from the point of time $t_2$ to $t_6$.

Thus, in a case of high frequency vibrations, the frequency is obtained by one cycle period. Accordingly, there is not fear that the resolution of sampling is deteriorated to cause an error in decision of frequency.

Next, an explanation will be given on low frequency vibrations shown in FIG. 5-(b). Points of time $t_7$ and $t_8$ are the same as those $t_1$ and $t_2$ in FIG. 5-(a). In this case, the cycle period measurement starts from the point of time $t_8$. At a point of time $t_{10}$, the output is the same at the point of time $t_4$ in FIG. 5-(a), whereby the procedure advances to the step S11 to measure the half cycle period T. In this case, the measured half cycle period T becomes $T_{21}$. Since $T_0 < T_{21}$, the procedure advances to the step S12 and the frequency is obtained by the measured half cycle period $t_{21}$.

Thus, in a case of low frequency vibrations, the frequency is obtained by a half cycle period. Accordingly, when the vibration over the predetermined level is generated, the frequency thereof can be decided in a short time.

After the frequency of the waveform of the acceleration sensor 20 is thus obtained, in steps S13 and S14, and optimum characteristic of a damping force of the suspension is decided, and in steps S15, S16 and S17, the damping force is controlled to the optimum characteristic.

In the step S13, it is judged whether or not conditions to set the damping force to HARD are satisfied on the basis of the obtained frequency and the output level of the acceleration sensor 20. If conditions to set the damping force to HARD are satisfied (YES in step S13), the procedure advances to the step S15 and the damping force of suspension is set to HARD. If not (NO in step S13), the procedure advances to the step S14. IN the step S14, it is judged whether or not conditions to set the damping force to MEDIUM are satisfied. If conditions to set it to MEDIUM are satisfied (YES in step S14), in the step S16, the damping force is set to MEDIUM. If not (NO in step S14), in the step S17, the damping force is set to SOFT.

In addition, in the above-mentioned example, the procedure has been described on the basis of vertical vibrations (acceleration) of the vehicle body 1, and the damping force of suspension is similarly controllable on the basis of lateral vibrations of the vehicle body 1.

SECOND EMBODIMENT

The second embodiment of the control apparatus of the present invention is the same in construction as the first embodiment shown in FIG. 1, 2 and 3.

Figure 6:
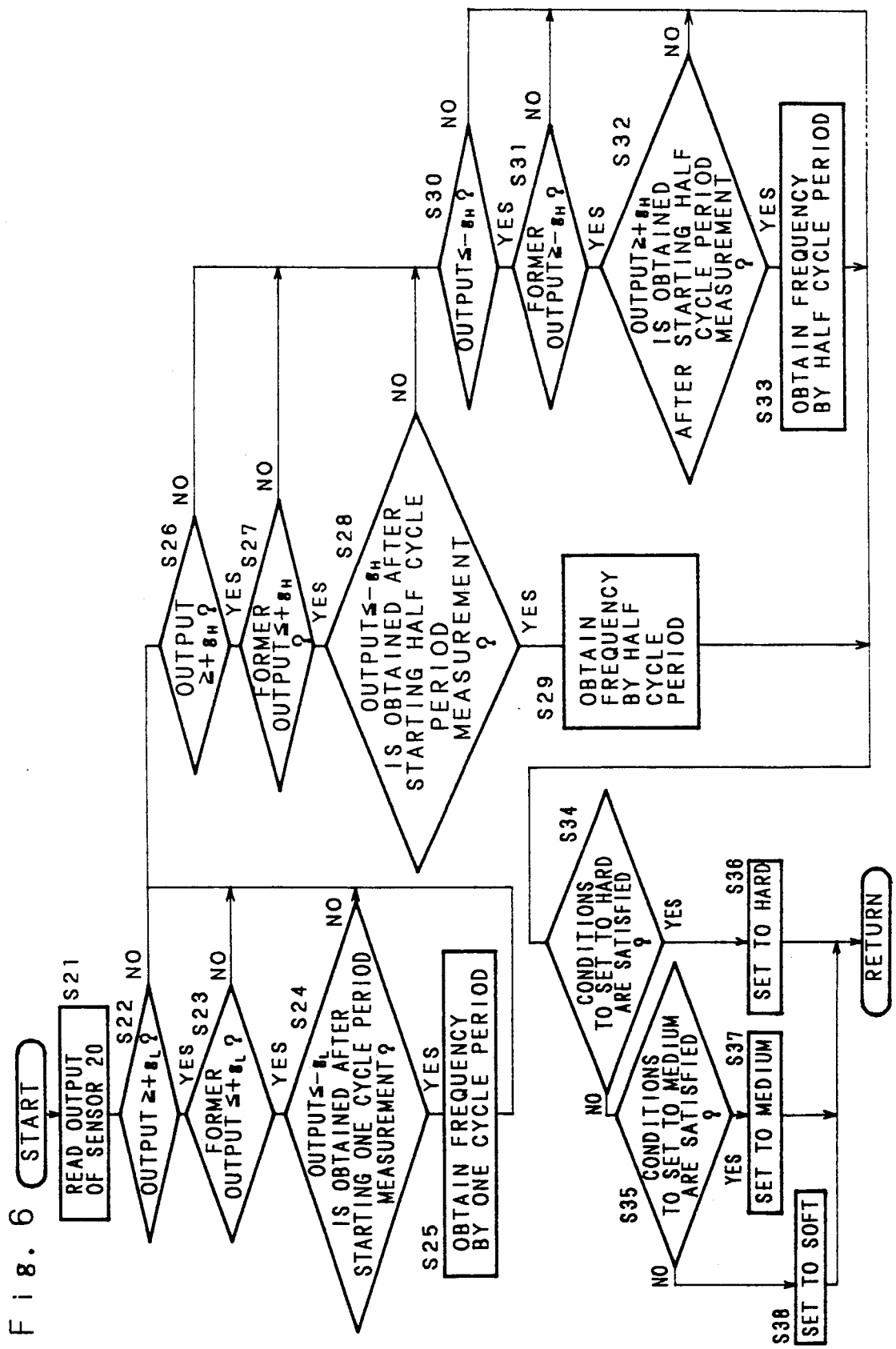
FIG. 6 is a flow chart showing a procedure of second embodiment of the present invention.
Figure 7:
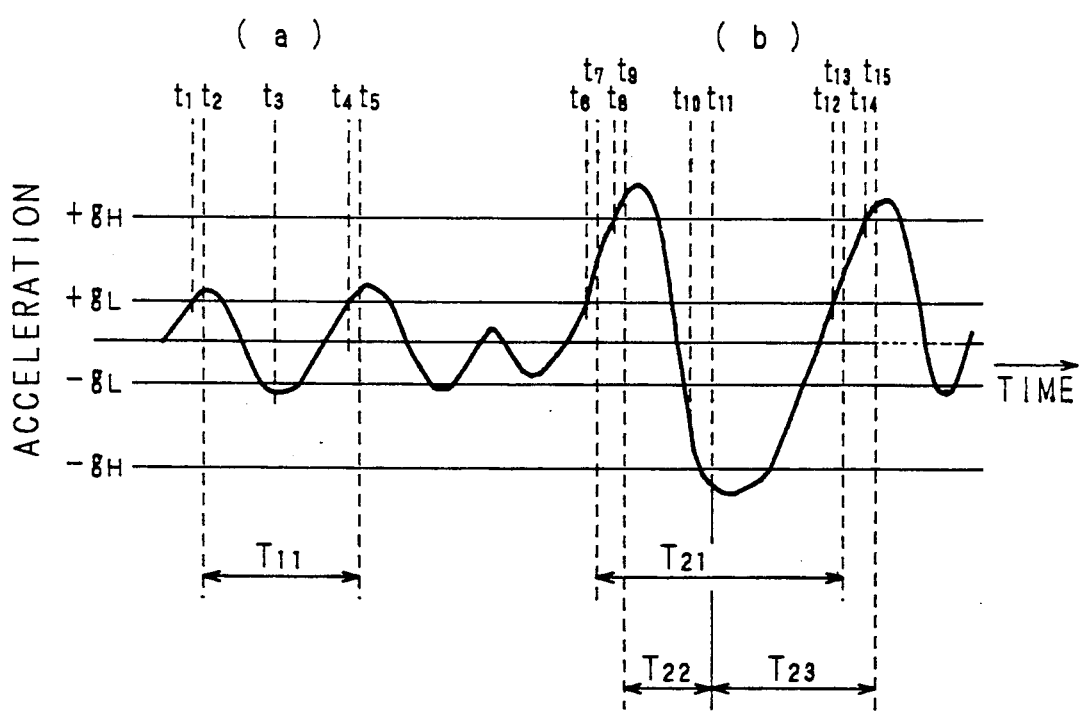
FIG. 7 is a waveform chart of vertical vibration of a vehicle body for explaining the procedure of second embodiment.

An explanation will be given on the procedure of the second embodiment of the control apparatus 7 with reference to the flow chart in FIG. 6 and an output waveform of the acceleration sensor 20 in FIG. 7. FIG. 7-(a) shows an output waveform of the acceleration sensor 20 during the below-spring vibration and FIG. 7-(b) shows an output waveform of the same during the above-spring vibration.

At first, an explanation will be given on frequency decisions in vibrations smaller in amplitude and shorter in cycle period as shown in FIG. 7-(a). The measurement of the cycle period starts at a point of time $t_2$ and ends at time $t_5$. The cycle period is measured for a lapse of time $T_{11}$ from the point of time $t_2$ to time $t_5$ and the frequency is obtained by the measured one cycle period.

The procedure at the point of time $t_5$ will be described. In a step S21, an output of the acceleration sensor 20 is read in and the procedure advances to a step S22. In the step S22, since the output of acceleration sensor 20 is over a positive predetermined level ($+g_L$) for the high frequency, the procedure advances to a step S23. In the step S23, the former output (at the point of time $t_4$) of acceleration sensor 20 is not more than ($+g_L$), whereby the procedure advances to a step S24. In the step S24, an output not more than a negative predetermined level ($-g_L$) for the high frequency is detected at the point of time $t_3$ after starting the cycle period measurement, whereby the procedure advances to a step S25. In the step S25, the frequency is obtained by the measured cycle period $T_{11}$.

In addition, since the output of the acceleration sensor 20 does not exceed predetermined levels ($+g_H$, $-g_H$) for the low frequency in the vibration of high frequency shown in FIG. 7-(a), measurement of half cycle period as for the low frequency vibration is not carried out. Thus, in the high frequency vibration, the frequency is obtained on the basis of the measured one cycle period. Accordingly, there is no fear that the resolution of sampling deteriorates to cause an error in decision of frequency.

Next, an explanation will be given on frequency decisions for vibrations larger in amplitude and longer in cycle period as shown in FIG. 7-(b). The measurement of cycle period starts at a point of time $t_7$ and ends at a point of time $t_{13}$, which is carried out for a lapse of time $T_{21}$ from the point of time $t_7$ to that $t_{13}$ and then next measurement again starts.

In this case, since the output of the acceleration sensor 20 exceeds the predetermined level ($+g_H$, $-g_H$) for the low frequency, half cycle period measurement is carried out with respect to the low frequency vibration, and the frequency is obtained by the measured half cycle period. The measurement of half cycle period of low frequency starts from the point of time $t_9$, the measurement of half cycle period $T_{22}$ of low frequency ends at the point of time $t_{11}$, and the measurement of half cycle period again starts. Next, explanation will be given on the procedure of control apparatus 7 at the point of time $t_{11}$.

In the step S21, the output of the acceleration sensor 20 is read in and the procedure advances to the step S22. Since the output is smaller than ($+g_L$) in the step S22, the procedure advances to a step S26. In the step S26, the output is smaller than the positive predetermined level ($+g_H$) for the low frequency, so that the procedure advances to a step S30. In the step S30, since the output is smaller than the negative predetermined level ($-g_H$) for the low frequency, the procedure advances to a step S31. In the step S31, since the former output (at the point of time $T_{10}$) is not less than ($-g_H$0, the procedure advances to a step S32. In the step S32, since an output not less than ($+g_H$) is detected (for example, at the point of time $t_9$) after the half cycle period measurement starts, the procedure advances to a step S33. In the step S44, the frequency is obtained from a half cycle period $T_{22}$ of a lapse of time from the point of time $t_9$ to time $t_{11}$ and the procedure advances to a step S34.

In addition, if the output is larger than ($-g_H$) in the step S30, the former output is smaller than ($-g_H$) in the step S31, and in the step S32 the output not less than $+g_H$) is not obtained after the measurement starts, the frequency decision by a half cycle period is not carried out in any case, whereby the procedure advances to a step S34.

Next, an explanation will be given on the procedure of control apparatus 7 at the point of time $t_{15}$.

In the step 21, the output of the acceleration sensor 20 is read in and the procedure advances to the step S22. In the step S22, since the output is over ($+g_L$), the procedure advances to the step S23. In the step S23, since the former output (at the point of time $t_{14}$) is over ($+g_L$), the procedure advances to the step S26. In the step 26, since the output is over ($+g_H$), the procedure advances to a step S27. In the step S27, since the former output (at the point of time $t_{14}$) is not more than ($+g_H$), the procedure advances to a step S28. In the step S28, an output not more than ($-g_H$) is detected (for example, at the point of time $t_{11}$), the procedure advances to a step S29. In the step S29, the frequency is obtained by a half cycle period $T_{23}$ of a lapse of time from the point of time $t_{11}$ to $t_{15}$ and the procedure advances to the step S34.

In addition, if the output is lower than ($+g_H$) in the step S26, the former output is larger than ($+g_H$) in the step S27, and in the step S28 the output not more than ($-g_H$) is not obtained after the measurement starts, the procedure advances to the step S30.

Thus, after the frequency of output waveform of the acceleration sensor 20 is obtained, in steps S34 and S35 an optimum characteristic of the damping force of suspension is decided, and in steps S36, S37 and S38, the damping force is controlled to the optimum characteristic.

In the step S34, it is judged whether or not conditions to set the damping force to HARD are satisfied, on the basis of the obtained frequency and the output level of the acceleration sensor 20. If conditions to set the damping force to HARD are satisfied, the procedure advances to the step S36, thereby setting the damping force of the suspension to HARD. If not, the procedure advances to the step S35. In the step S35, it is judged whether or not conditions to set the damping force to MEDIUM are satisfied. If conditions to do so are satisfied, the damping force is set to MEDIUM in the step S37. If not, the damping force is set to SOFT in the step S38.

In addition, in the above-mentioned example, the procedure based on the vertical vibrations (acceleration) of the vehicle body 1 is described. Similarly, the damping force of suspension is controllable on the basis of lateral vibrations of the vehicle body 1.

In the above-mentioned first and second embodiments, the examples of controlling the damping force of suspension are described, but the spring constant of suspension and torsion quantity of stabilizer are quite similarly controllable. All of them may of course by simultaneously controlled.

Also, the characteristic is changed over into 3 steps of SOFT, MEDIUM and HARD, but not limited thereto. The present invention is applicable to a case where the characteristic is changed-over into two or four steps or more.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A control apparatus of a support unit for supporting a vehicle body which controls characteristics thereof, comprising:

detecting means for detecting vibrations of said vehicle body and outputting an acceleration signal indicative of said vibrations;

change-over means responsive to a control signal for setting at least one of said characteristics, of said support unit into one of a plurality of degrees; and control means for measuring a half cycle period and a one cycle period of said acceleration signal detected by said detecting means, obtaining a frequency of said acceleration signal from at least one of said measured values, and controlling said change-over means on the basis of said obtained frequency and an amplitude of said acceleration signal, wherein said control means, when said measured half cycle period is longer than a predetermined time, obtains said frequency of said acceleration signal from said measured value of said half cycle period and, when said measured half cycle period is not longer than said predetermined time, successively measures a next half cycle period, thereby obtaining said frequency of said acceleration signal from said measured value of one cycle period.

2. A control apparatus of a support unit according to claim 1, wherein said control means starts measurement for said half cycle period and one cycle period from a point of time when said amplitude of said acceleration signal detected by said detecting means becomes equal to or greater than a predetermined level in one direction from a predetermined reference point.

3. A control apparatus of a support unit according to claim 2, wherein said control means finishes said measurement for a half cycle period when said amplitude of said acceleration signal becomes equal to or greater than a predetermined level in a direction opposite to said one direction.

4. A control apparatus of a support unit according to claim 2, wherein said control means finishes said measurement for one cycle period when said amplitude of said acceleration signal becomes equal to or greater than said predetermined level in the same direction as said one direction after said amplitude of said acceleration signal becomes equal to or greater than said predetermined level in said direction opposite to one direction.

5. A control apparatus of a support unit according to claim 1, wherein said control means judges whether the frequency of vibration is obtained by the measured value of a half cycle period or the frequency of vibration is obtained by the measured value for one cycle period on the basis of said amplitude of said acceleration signal detected by said detecting means.

6. A control apparatus of a support unit according to claim 5, wherein said control means starts measurement for a one cycle period from a point of time when said amplitude of said acceleration signal becomes equal to or greater than a first predetermined level in one direction from a predetermined reference point, and starts measurement for a half cycle period from a point of time when said amplitude of said acceleration signal becomes equal to or greater than a second predetermined level in one direction from said predetermined reference point.

7. A control apparatus of a support unit according to claim 6, wherein said second predetermined level exceeds said first predetermined level.

8. A control apparatus of a support unit according to claim 7, wherein said control means finishes said measurement for said one cycle period when said amplitude of said acceleration signal becomes equal to or greater than said first predetermined level in the same direction as said one direction after said amplitude of said acceleration signal becomes equal to or greater than said first predetermined level in said direction opposite to said one direction, thereby obtaining said frequency by said measured value.

9. A control apparatus of a support unit according to claim 7, wherein said control means finishes said measurement for a half cycle period when said amplitude of said acceleration signal becomes equal to or greater than said second predetermined level in said direction opposite to said one direction, thereby obtaining, said frequency by said measured value.

10. A control apparatus of a support unit according to claim 1, wherein said detecting means detects vertical vibrations of said vehicle body.

11. A control apparatus of a support unit according to claim 1, wherein said detecting means detects lateral vibrations of said vehicle body.

12. A control apparatus of a support unit according to claim 1, wherein said detecting means has an acceleration sensor for detecting acceleration of said vehicle body.

13. A control apparatus of a support unit according to claim 1, wherein said support unit is a suspension and said characteristic includes at least a damping force and a spring constant of said suspension.

14. A control apparatus of a support unit according to claim 1, wherein said support unit is a stabilizer and said characteristic include at least a torsion quantity of said stabilizer.

15. A control apparatus of a support unit according to claim 1, wherein said support unit is a suspension and a stabilizer and said characteristics include at least a damping force and a spring constant of said suspension and a torsion quantity of said stabilizer.

* * * * *